(12) United States Patent
Dimanshteyn et al.

(10) Patent No.: US 9,080,037 B2
(45) Date of Patent: Jul. 14, 2015

(54) ULTRA-LOW PETROLEUM PLASTICS

(75) Inventors: Felix A. Dimanshteyn, West Hartford, CT (US); Richard J. Barone, Wilton, CT (US)

(73) Assignee: American Thermal Holdings Company, Richmond Hill, GA (US)

(*) Notice: Subject to any disclaimer, the term of this patent is extended or adjusted under 35 U.S.C. 154(b) by 151 days.

(21) Appl. No.: 13/411,114

(22) Filed: Mar. 2, 2012

(65) Prior Publication Data
US 2012/0214915 A1    Aug. 23, 2012

Related U.S. Application Data

(63) Continuation of application No. 11/174,321, filed on Jul. 1, 2005, now abandoned.

(51) Int. Cl.
*C08K 3/24*    (2006.01)
*C08K 3/32*    (2006.01)
*C08K 3/00*    (2006.01)
*C08L 75/04*   (2006.01)
*C08L 75/06*   (2006.01)

(52) U.S. Cl.
CPC .............. *C08K 3/32* (2013.01); *C08K 3/0058* (2013.01); *C08L 75/04* (2013.01); *C08L 75/06* (2013.01)

(58) Field of Classification Search
CPC ............... C08K 3/0058; C08K 3/24; C08K 2003/3054; C08L 75/04; C08L 75/06; C08L 75/08; C08L 75/10; C08L 75/12; C08L 75/14; C08L 75/16
USPC ........................................................ 524/423
See application file for complete search history.

(56) References Cited

U.S. PATENT DOCUMENTS 3,993,514 A * 11/1976 Pacanowsky et al. ....... 149/19.5
5,821,284 A * 10/1998 Graham et al. ............... 523/179
2005/0054754 A1 * 3/2005 Fan et al. ......................... 524/1

OTHER PUBLICATIONS

Lewis Sr., Richard J. "Hawley's Condensed Chemical Dictionary", pp. 64-65,14th Edition, John Wiley & Sons Inc., New York, NY (2001).

* cited by examiner

*Primary Examiner* — Peter D Mulcahy
(74) *Attorney, Agent, or Firm* — Leydig, Voit & Mayer, Ltd.

(57) ABSTRACT

Plastic-like compositions having ultra-low contents of petroleum derived materials are provided. The materials comprise up to about 80% by weight of an inorganic salt having an average particle size between about 0.001 and about 300 μm and a plastic binder. The compositions have a low propensity to ignite or smoke in the presence of heat or flame.

20 Claims, No Drawings

ULTRA-LOW PETROLEUM PLASTICS

FIELD OF INVENTION

The present invention relates generally to plastic-like materials having diminished contents of petroleum-derived products. The invention also relates to fire retardant plastic-like materials.

BACKGROUND OF THE INVENTION

Conventional plastic materials comprise synthetic polymers derived predominately from petroleum. The disadvantages of such petroleum-derived products are well known and include, for example, the rapid depletion of the world's petroleum reserves, the deleterious environmental consequences resulting from the poor biodegradability of petroleum-derived plastic materials, and the fluctuating cost of plastic production with the price of oil. Even conventional "low petroleum" plastics such as polyvinyl chloride ("PVC"), which comprises approximately 43% by weight petroleum feedstock products, suffer from these disadvantages.

Accordingly, it has long been desirable to decrease the petroleum content of plastic products. Unfortunately, satisfactory alternatives to petroleum-derived plastic materials have not heretofore been commercially viable. Therefore, there is a need in the art for plastic or plastic-like materials which have a reduced petroleum content as compared to conventional plastics.

It is therefore an object of the present invention to provide plastic-like materials having a reduced content of petroleum derivatives.

It is further an object of the present invention to provide plastic-like materials having chemical properties, such as fire retardancy and smoke suppression, superior to conventional plastics.

It is also an object of the present invention to provide materials having a reduced content of petroleum derivatives which are economically viable or superior alternatives to conventional plastics.

SUMMARY OF THE INVENTION

In accordance with the foregoing objectives and others, the present invention provides plastic-like materials having interesting physical and mechanical properties, chemical properties such as fire retardancy and smoke suppression superior to conventional plastics, and diminished petroleum-derived material content as compared to conventional plastics.

It has surprisingly been found that plastic-like materials comprising between about 20 to about 80% by weight of an inorganic salt can be obtained which have physical, mechanical, and chemical properties that are useful for many of the applications in which conventional plastics are employed. Some properties, such as fire retardancy, smoke suppression, toxicity of smoke release, and heat resistance are substantially improved as compared to conventional plastics. Importantly, the plastic-like materials or the invention are cheaper to produce than conventional plastics.

In one aspect of the present invention a plastic-like composition is provided comprising about 10% to about 80% by weight of a plastic polymer and about 20% to about 80% by weight of an inorganic salt in particulate form. In an interesting aspect of the invention, the weight percentage of inorganic salt is above 50% and tends toward the upper limit of the given range. The composition has a reduced propensity to ignite or smoke in the presence of heat or flame as compared to the thermoplastic polymer which it comprises. The polymer may be either a thermoplastic polymer or a thermosetting polymer. In one embodiment the plastic is a thermosetting plastic such as, for example, an epoxy resin. In another embodiment, the plastic polymer is a thermoplastic polymer such as, for example, a polyvinyl, polyacrylate, polyurethane, polycarbonate, polyester, polyamide, or polyolefin polymer, or any combination thereof. The inorganic salt according to one embodiment is a salt of phosphoric acid or sulfuric acid and in particular an ammonium salt of those acids. In another aspect of the invention, the inorganic salt is provided having a relatively small particle size, such as, for example between about 0.001 µm to about 1,000 µm. Within this range, it has been found to be desirable to provide inorganic salts with particle sizes tending toward the lower limit.

These and other aspects of the invention will be better understood by reference to the following detailed description of the invention.

DETAILED DESCRIPTION OF THE INVENTION

Unless expressly defined otherwise herein, all terms are intended to have their ordinary meaning in the art. As used herein, the term "plastic-like" refers to a material which comprises less polymeric material than conventional plastics but is nonetheless capable of being molded or formed with the application of heat or pressure in the same manner as a conventional plastic material. The "plastic-like" materials of the present invention share many of the physical and mechanical properties of conventional plastics, i.e., they may be shaped using any of the conventional techniques useful for shaping conventional plastics, including for example, injection molding and rolling. However, the plastic-like compositions of the invention comprise far less polymeric material than conventional plastics.

The term "particulate form" is mean to expansively include any form of solid ammonium sulfate including but not limited to, crystalline particles, microcrystalline particles, micronized particles, nanoparticles, amorphous particles, and the like. The term "thermoplastic" is meant to have its ordinary meaning in the art and generally refers to plastics which are capable of repeatedly softening when heated and hardening when cooled. The term "thermosetting" is also meant to have its ordinary meaning in the art and generally refers to plastics which cannot be re-melted after being formed.

In the broadest embodiment of the invention, the plastic-like composition comprises about 10% to about 80% by weight of a plastic polymer and about 20% to about 80% by weight of an inorganic salt in particulate form. The composition has a reduced propensity to ignite or smoke in the presence of heat or flame as compared to the plastic polymer, alone. In certain embodiments, the composition is non-flammable when subjected to flame testing, such as U.S. Government standard for flammability resistance FAR 25.853(b).

An essential component of the composition is a plastic polymer. The plastic polymeric component of the present invention may be any plastic (i.e., a thermoplastic or a thermosetting). In one embodiment, the plastic is a thermoplastic polymer. With due regard to the typical commercial thermoplastic polymers, particular mention may be made, without intending to limit the invention, to acrylics, such as polymethyl methacrylate (PMMA), acryl-nitrite butadiene styrene (ABS), high density polyethylene (HDPE), low density polyethylene (LDPE), polycarbonates, polyesters, including polybutylene terephthalate (PBT) and polyethylene terephthalate (PET), polyamides, such as nylon, polyolefins, including but not limited to polyethylene and polypropylene, polyorganosiloxane rubber, polytetrafluoroethylene (PTFE), polystyrene (PS), silicone polymers and copolymers, styrene-acrylonitrile (SAN), vinyl plastics, including but not limited to vinyl acetate, polyvinyl chloride (PVC), chlorinated polyvinyl chloride (CPVC), and polymers and copolymers of vinyl alcohol (VOH), polyurethanes, and polyvinylidene chloride (PVDC). Cellulosics, polyamideimide (PAI), polyarylate (PAR), polyetherimide (PEI), poly(phenylene sulfide) (PPS), polysulfone, polyethersulfone (PES), polyurea, polyetherketone (PEK), and polyetheretherketone (PEEK) are also contemplated to be useful in the practice of the invention.

Particularly interesting thermoplastic polymers are those formed by polymerization of vinyl monomers, including, but not limited to olefinic monomers such as, for example, ethylene, propylene, 1-butene, 1-pentene, 1-hexene, 1-heptene, 1-octene, 1-nonene, 1-decene, and 4-methyl-1-pentene, wherein the alkyl substituents may be either linear or branched or may be cycloalkyl constituents. Vinyl aromatic monomers such as styrene and other aryl or hetero-aryl substituted vinyl monomers are also suitable. Exemplary styrenic monomers include styrene, α-methylstyrene, p-tertiary butylstyrene, p-methylstyrene, o-methylstyrene, m-methylstyrene, 2,4-dimethylstyrene, ethylstyrene, α-methyl-p-methyl styrene, bromostyrene, and the like.

Specific examples of homopolymers and copolymers of olefinic monomers are disclosed in U.S. Pat. No. 6,890,991 to Fujimoto et al, the disclosure of which is hereby incorporated by reference, and include low density polyethylene, ultra-low-density polyethylene, ultra-super-low density polyethylene, linear low density polyethylene, high density polyethylene, ultrahigh molecular weight polyethylene, polypropylene, ethylene-propylene copolymer, polymethylpentene, polybutene, and the like.

The vinyl monomers may also be vinyl halides. Desirable halogen substituents are chlorine, bromine, fluorine or combinations thereof. A preferred halogen is chlorine as in the case of the vinyl chloride monomer. In that regard, polyvinyl chloride ("PVC") is a particularly notable plastic for use in the present invention. Other halogenated monomers include without limitation vinylidene chloride, tetrafluoroethylene, chlorotrifluoroethylene, and hexafluoropropylene.

It will be understood that the term "vinyl plastic" includes homopolymers and copolymers of vinyl monomers. The term "PVC" is meant to include homopolymers of vinyl chloride as well as copolymers of vinyl chloride containing up to about 20% by weight of other monovinylidene compounds copolymerizable therewith, including but not limited to vinyl esters, such as vinyl acetate, vinylidene chloride, and alkyl esters of unsaturated mono- or dicarboxylic acids such as acrylic acid, methacrylic acid, maleic acid and fumaric acid, including vinyl acetate, acrylate esters, and methacrylate esters, and olefins such as ethylene and propylene, and the like.

Other suitable monomers for use in the thermoplastic polymers of the invention include, but are not limited to, those disclosed in U.S. Pat. No. 6,875,832 to White et al., the disclosure of which is hereby incorporated by reference, namely allylic monomers, (meth)acrylic acid, (meth)acrylates, (meth)acrylamide, N- and N,N-disubstituted (meth)acrylamides, vinyl esters of carboxylic acids and mixtures thereof.

The thermoplastic polymer of the invention may be a thermoplastic acrylic polymer or copolymer such as describe in, for example, U.S. Pat. No. 4,473,679 to Falk et al and U.S Pat. No. 4,452,941 to Kishida et al., the disclosures of which are hereby incorporated by reference. Special mention may be made of the acrylate monomers disclosed in U.S. Pat. No. 6,875,832 which include, without limitation, $C_1$-$C_{20}$ alkyl (meth)acrylates (including linear or branched alkyls and cycloalkyls) which include, but are not limited to, methyl (meth)acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethylcyclohexyl (meth)acrylate and isocane (meth)acrylate; oxirane functional (meth)acrylates which include, but are not limited to, glycidyl (meth)acrylate, 3,4-epoxycyclohexylmethyl(meth)acrylate, and 2-(3,4-epoxycyclohexyl) ethyl(meth)acrylate; hydroxy alkyl (meth)acrylates having from 2 to 4 carbon atoms in the alkyl group which include, but are not limited to, hydroxyethyl (meth)acrylate, hydroxypropyl (meth)acrylate and hydroxybutyl (meth)acrylate. The residues may each independently be residues of monomers having more than one (meth)acryloyl group, such as (meth)acrylic anhydride, diethyleneglycol bis(meth)acrylate, 4,4'-isopropylidenediphenol bis(meth)acrylate (bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

The thermoplastic polymers may also contain maleimide monomers such as maleimide, N-methyl maleimide, N-isopropyl maleimide, N-butyl maleimide, N-hexyl maleimide, N-octyl maleimide, N-dodecyl maleimide, N-cyclohexyl maleimide, N-phenyl maleimide, N-2-methyl maleimide, N-2,3-dimethyl phenyl maleimide, N-2,4-dimethyl phenyl maleimide, N-2,3-diethyl phenyl maleimide, N-2,4-diethyl phenyl maleimide, N-2,3-dibutyl phenyl maleimide, N-2,4-dibutyl phenyl maleimide, N-2,6-dimethyl phenyl maleimide, N-2,3-dichlorophenyl maleimide, N-2,4-dichlorophenyl maleimide, N-2,3-dibromophenyl maleimide or N-2,4-dibromophenyl maleimide, and the like as disclosed in U.S. Pat. No. 6,855,769 to Su, the disclosure of which is hereby incorporated by reference.

The thermoplastic polymers may comprise a polyester resin as described in, for example, U.S. Pat. No. 6,890,991 to Fujimoto et al, the disclosure of which is hereby incorporated by reference. Such polyester resins are obtained by the polycondensation reaction of one or more dicarboxylic acids such as, for example, terephthalic acid, isophthalic acid, naphthalenedicarboxylic acid, 4,4'-diphenyldicarboxylic acid, diphenyletherdicarboxylic acid, α, β-bis (4-carboxyphenoxy) ethane, adipic acid, sebacic acid, azelaic acid, decanedicarboxylic acid, dodecanedicarboxylic acid, cyclohexanedicarboxylic acid and dimer acid, or ester-forming derivarives thereof, and one or more glycols such as, for example, ethylene glycol, propylene glycol, butanediol, pentanediol, neopentyl glycol, hexanediol, octanediol, decanediol, cyclohexane dimethanol, hydroquinone, bisphenol A, 2,2-bis(4'-hydroxyethoxyphenyl)propane, xylene glycol, polyethylene ether glycol, polytetrafluoroethylene ether glycol, and aliphatic polyester oligomer having a hydroxyl group at both terminals. The polyester resin may be either a homopolyester or a copolyester. Other exemplary thermoplastic polyesters are disclosed in, for example, U.S. Pat. No. 6,809,151 to Lacroix et al., the disclosure of which is hereby incorporated by reference. Particularly interesting polyesters are polybutylene terephthalate (PBT) and polyethylene terephthalate (PET).

Suitable thermoplastic polyurethanes materials include those disclosed in U.S. Pat. No. 6,881,856 to Tanaka et al., the disclosure of which is hereby incorporated by reference. As disclosed in that patent, theremoplastic polyurethanes are obtained by reaction of polyethercarbonate diols with a diisocyanate and a chain extender, such as a polyol or polyamine compound, by a polyurethane-producing reaction. The exemplary polyethercarbonate diols, diisocyanates, and chain extenders disclosed in U.S. Pat. No. 6,881,856 are hereby incorporated by reference.

The thermoplastic polymers of the invention may also comprise thermoplastic polyamides (nylons) such as those disclosed in U.S. Pat. No. 6,870,005 to Lieberman et al., the disclosure of which is hereby incorporated by reference. These thermoplastic polyamides may be prepared by polymerization of, for example, one or more epsilon lactams such as caprolactam, pyrrolidone, lauryllactam and aminoundecanoic lactam, or amino acid, or by condensation of dibasic acids and diamines. Exemplary polyamides include polycaprolactam (nylon 6), polylauryllactam (nylon 12), polyhexamethylenedipamide (nylon 6,6), polyhexamethyleneazelamide (nylon 6,9), polyhexamethylenesebacamide (nylon 6,10), polyhexamethyleneisophthalamide (nylon 6,10), the condensation product of 11-aminoundecanoic acid (nylon 11), polytetramethyleneadipamide (nylon 4,6), polyhexamethyleneazelaamide (nylon 6,9), polyhexamethylenesebacamide (nylon 6,10), polyhexamethylenedodecanediamide (nylon 6,12), and polydodecanemethylenedodecanamide (nylon 12,12). Other suitable nylon resins are disclosed in, for example, U.S. Pat. No. 6,861,470, the disclosure of which is hereby incorporated by reference.

Thermoplastic polycarbonate plastics are also well known in the art and include, for example, those described in U.S. Pat. No. 5,756,641 to Kuhling et al., the disclosure of which is hereby incorporated by reference. Such polycarbonates are formed by transesterification of aromatic diphenols with carboxylic acid diaryl esters. Exemplary diphenols include, without limitation, 4,4'-dihydroxydiphenyl, 4,4'-dihydroxydiphenyl sulphide, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane, and 1,1-bis-(4-hydroxyphenyl)-3,3,5-trimethylcyclohexane. Exemplary carboxylic acid diesters include without limitation di-$C_6$-$C_{20}$-aryl esters, such as the diesters of phenol or of alkyl-substituted phenols. Special mention may be made of diphenyl carbonate or dicresyl carbonate.

Particularly interesting polymers according to the invention comprise polyvinyls, polyacrylates, polyurethanes, polycarbonates, polyesters, polyamides, polyolefins, and combinations thereof Polyvinyl and polyolefin polymers are especially interesting polymers according to the invention.

The foregoing monomers and polymers are provided by way of example only and are not intended to limit the scope of the invention. The skilled artisan will recognize that any of the numerous thermoplastic polymers known in the art are contemplated to be within the scope of the present invention.

Alternatively, the plastic component may be a thermosetting plastic such as, without limitation, epoxy resin, polyester resin, natural rubbers such as latex, melamine plastics such as Formica®, phenolics such as Bakelite, urea-formaldehyde, and the like.

The compositions of the present invention also include as an essential component an inorganic salt. While it is contemplated that a wide variety of inorganic salts will be useful in the practice of the invention, it is advantageous to employ a fire extinguishing inorganic salt. Particular mention may be made of inorganic salts of phosphoric acid, metaphosphoric acid, orthophosphoric acid, pyrophosphoric acid, polyphosphoric acid, sulfuric acid, and hydrochloric acid. Ammonium salts are especially useful. Accordingly, particularly interesting inorganic salts include but are not limited to ammonium phosphates, such as $(NH_4)H_2PO_4$ (mono-ammonium phosphate or ammonium phosphate) and $(NH_4)_2HPO_4$ (di-ammonium phosphate), and ammonium sulfates, including $(NH_4)_2SO_4$ (ammonium sulfate or di-ammonium sulfate) and $(NH_4)HSO_4$ (ammonium hydrogen sulfate or ammonium bisulfate), and $(NH_4)_2Cl$. In one interesting embodiment, the inorganic salt comprises ammonium sulfates, especially $(NH_4)_2SO_4$. Combinations of any of the foregoing inorganic salts are also contemplated to be useful.

The inorganic salt is in particulate form. While it is contemplated that any size inorganic salt particulate material will be useful in the practice of the invention, preferred materials will have average particle diameters of below about 1 mm. Accordingly, in one embodiment of the invention, the inorganic salt particulate material has an average particle size of about 0.001 µm to about 1,000 µm. In another embodiment, the inorganic salt particulate material has an average particle size of about 0.01 µm to about 300 µm. In particularly interesting embodiments, the particle size of the inorganic salt is between about 0.1 to about 30 µm, 1 and about 10 µm, and about 5 to about 8 µm. Further, the invention embraces embodiments within the range of 0.001 µm to about 1,000 µm wherein the lower and upper limits are increased or decreased by intervals of 5 µm, each such sub-range being an embodiment of the invention.

The particles size distribution of the inorganic salt particulate material may be selected by any known method in the art, including the use of mesh sieves. The particle sizes which will pass through standard (Tyler or BS-410) mesh sizes are well known in the art. Inorganic salt particulate materials which have an average particle size sufficiently small to pass through any of the standard Tyler mesh sizes are contemplated to be useful in the practice of the present invention. Accordingly, with regard to the standard Tyler mesh sizes, the invention embraces embodiments having particle sizes of less than about 297, 250, 210, 177, 149, 105, 74, 62, 53, 44, 37, 20, 10, and about 5 µm, respectively. Further control over the distribution of particle size is obtainable by passing the material through two sieves of different mesh, as is well known in the art. The skilled artisan will recognize that various permutations of standard mesh sizes can by employed to obtain a variety of particle size ranges, each of which is contemplated to be an embodiment of the invention. Of course, it is also within the skill in the art to employ non-standard mesh sizes to obtain any desired particle sizes which are larger, smaller, or intermediate to those provided by the standard Tyler mesh sizes.

Methods for mechanically micronizing particulate matter (i.e., crushing, grinding, and milling) are well known in the art as disclosed in, for example, U.S. Pat. No. 6,726,133 to Hahn et al and U.S. Pat. No. 5,732,894 to Sheahan, the disclosures of which is hereby incorporated by reference. Non-mechanical methods for forming micronized and nanoparticulate materials are also well known in the art, as disclosed in, for example, U.S. Pat. No. 5,874,029 to Subramaniam et al., the disclosure of which is hereby incorporated by reference. It is within the skill in the art to provide inorganic salts in particulate form having the particle sizes disclosed herein.

For example, U.S. Patent Application Pub. No. 2002/0065198 to Highsmith et al., which is incorporated herein by reference, discloses a process for ball milling commercially available ammonium sulfate granules of approximately 1 mm average size to produce micronized ammonium sulfate particles having the particle size profile shown in Table I:

TABLE I

| Tyler Sieve No. | Wt. % Retained |
| --- | --- |
| 48 | Less than 0.1 |
| 60 | 0.3 |
| 80 | 0.4 |
| 100 | 0.3 |
| 200 | 18 |
| 230 | 49 |
| 400 | 19 |
| pan | 13 |

The compositions of the invention generally comprise the plastic polymer between about 10% and about 80% by weight and comprise the inorganic salt between about 20% to 80% by weight, with the proviso the sum of the weight % of each component not exceed 100%. In variations of this embodiment, the lower limit of the weight ranges of inorganic salt may be at least 26%, 27%, 28%, or at least 29% by weight. The invention also contemplates sub-ranges within the foregoing ranges wherein the lower and/or upper limits are increased or decreased, respectively, by intervals of 5 weight %, each such sub-range being an embodiment of the invention.

In one embodiment, the compositions comprise the plastic polymer between about 10% and about 60% by weight and comprise the inorganic salt between about 30% to 80% by weight. In another embodiment, the compositions comprise the plastic polymer between about 10% and about 50% by weight and the inorganic salt between about 40% to 80% by weight. In another embodiment, the compositions comprise the plastic polymer between about 10% and about 40% by weight and the inorganic salt between about 50% to 80% by weight. In a further embodiment, the compositions comprise the plastic polymer between about 10% and about 30% by weight and the inorganic salt between about 60% to 80% by weight. In an yet another embodiment, the compositions comprise the plastic polymer between about 10% and about 20% by weight and the inorganic salt between about 70% to 80% by weight. The weight ratio of plastic polymer to inorganic salt is typically in the range of about 1:8 to about 5:1, including embodiments of 1:7 to about 4:1, 1:5 to about 3:1, 1:3 to about 2:1, and 1:2 to about 1:1.

One variant of the plastic-like compositions of the invention comprises: (a) about 10 to about 80% by weight of a plastic polymer; and (b) about 10 to about 80% by weight of an inorganic salt having an average particle size between about 0.001 and about 300 μm; said composition having a reduced propensity to ignite or smoke in the presence of heat or flame as compared to said plastic polymer alone; with the proviso that when the weight of the inorganic salt component is ammonium sulfate comprising 25% or less by weight of the composition, the plastic-like composition is substantially non-intumescent.

It is believed that the compositions of the invention comprise a plurality of inorganic salt particles, such as ammonium sulfate in particulate form, having any of the average particle sizes set forth above, held in a homogenous physical unit by a plastic polymeric binder. By "homogenous physical unit" it is meant that the inorganic salt and the plastic are not readily separable from one another. Unlike conventional plastics, in which a polymeric material forms a matrix which constitutes the bulk of the material, the bulk of the compositions of the invention may be provided by the inorganic salt. It is believed that in the present invention, the plastic material serves as a binder to hold the particulate matrix in place and impart flexibility, ductility, and the like, to the compositions.

The compositions of the invention may comprise additives. When present, additives may comprise between about 0.01% and about 35% by weight of the composition. In one embodiment, the additives comprises about 20% by weight of the composition.

The additives include all those well known in the art, including but not limited to, intumescent additives, plasticizers, stabilizers, fillers, blending resins, pigments, and additives, as well known to one skilled in the art. Any plasticizer, stabilizer, filler, or other additive known in the art may be used in the present invention. Suitable plasticizer, stabilizer, fillers, and other additives, include but are not limited to, those disclosed in U.S. Pat. No. 6,706,820 to Kumaki, et al., U.S. Pat. No. 5,552,484 to Enomoto, and U.S. Pat. No. 4,042,556 to Yoshinaga, the contents of which are hereby incorporated by reference herein. The plastics may further comprise U.V. stabilizers, colorants, and impact modifiers. Additives including, but not limited to, low flammability oils such as soybean and corn oils, calcium carbonate, calcium stearate, titanium dioxide, paraffin wax, oxidized PE lubricant, phthalate plasticizers, heat stabilizers, impact modifiers, and intumescent additives are particularly notable. The plasticizer 2-ethyl hexyl diphenyl (Santicizer® 141, Ferro Corp.) has been found useful in the practice of the invention. Thinners for processing may also be desirable in some applications.

If desired, blowing agents such as for example, chlorinated fluorocarbons, HCFCs, butane, isopentane, carbon dioxide, nitrogen, argon, and the like, may also be used to produce foamed products, all in accordance with well known practice in the art. Methods for making foamed plastic are disclosed in, for example, U.S. Pat. Nos. 3,983,296 and 4,120,833 to Purvis, et al., U.S. Pat. No. 4,017,657 to Foley, et al., U.S. Pat. No. 4,042,556 to Yoshinaga, U.S. Pat. Nos. 5,391,585 and 5,324,461 to Grohman, U.S. Pat. No. 5,686,025 to Martin, U.S. Pat. Nos. 5,783,613 and 5,786,399 to Beekman et al., U.S. Pat. Nos. 6,225,365 and 6,225,365 to Zerafati, et al., and S. K. Dey et al. "Inert-Gas Extrusion of Rigid PVC Foam" Journal of Vinyl & Additive Technology, March 1996, Vol. 2, No. 1, the contents of which are hereby incorporated by reference herein.

The compositions of the invention may be formed in any technique conventional for forming thermoplastics or thermosettings, including, for example, extrusion, injection molding, blow molding, rotomolding, thermoforming, calandering, and compression molding. The materials of the invention may be extruded in the same manner as conventional plastics, as disclosed in, for example, U.S. Pat. No. 6,350,400 to Piotrowski, U.S. Pat. No. 4,322,170 to Papenmeier; U.S. Pat. No. 3,983,186 to Eilers, et al., M. J. Stevens, "Extruder Principals and Operation", Elsevier Applied Science Publishers, New York, N.Y. (1985), and C. Rauwendaal, "Polymer Extrusion", Hanser Publishers, New York, N.Y. (1986), the contents of which are hereby incorporated by reference herein. The compositions are suitable for injection molding and the like. The compositions of the invention may also be formed by rolling under heat as is also well known in the art.

As evident from the foregoing, the compositions of the invention contain far less polymeric material derived from petroleum than conventional plastics. For example, conventional compounded PVC has the makeup given in Table II.

TABLE II

| Material | Weight Percent (based on PVC resin) |
| --- | --- |
| PVC Resin | 100 |
| Impact Modifier | 5.0 |
| Heat Stabilizer | 0.8 |
| Filler (CaCO₃) | 10 |
| Calcium Stearate | 1.4 |
| Processing Aid | 0.8 |
| Oxidized PE Lubricant | 0.15 |

TABLE II-continued

| Material | Weight Percent (based on PVC resin) |
|---|---|
| Paraffin Wax | 1.2 |
| TiO$_2$ | 2.0 |

As shown in Table III, conventional compounded PVC comprises approximately 83% by weight polyvinyl chloride polymer, which itself comprises 43% by weight petroleum-derived material. Thus, even polymers such as PVC, which is generally considered to be a "low-petroleum" content material, contains 0.36 pounds (or 36% by weight) of polymer derived from petroleum for every pound of compounded PVC. In contrast, Table III provides three exemplary low-petroleum content formulations of the invention. In each case, the compounded PVC resin is mixed with ammonium sulfate and plasticizer in the ratios given.

TABLE III

| Sample | ammonium sulfate (wt. %) | Plasticizer (wt. %) | Compounded PVC (wt. %) | Weight % of petroleum-derived polymeric component |
|---|---|---|---|---|
| 1 | 60 | 19 | 21 | 7.6 |
| 2 | 55 | 19 | 26 | 9.4 |
| 3 | 50 | 19 | 31 | 11.2 |

Based on the foregoing, the benefits of the present invention as applied to high petroleum content plastics, such as, for example, polyethylene and polypropylene, are immediately apparent. The petroleum based content of such plastics can be reduced by at least about 30%, 35%, 40%, 45%, 50%, 55%, 60%, 65%, 70%, 75%, or 80%, each being considered an embodiment of the invention. It is contemplated that even greater reductions in the petroleum based content of plastic materials are achievable with the present invention.

The compositions of the invention have a reduced propensity to ignite or smoke in the presence of heat or flame as compared to the plastic binder material alone. This property is believed to arise from the reduced petroleum content of the materials and the fact that flame retardant inorganic salts, such as ammonium sulfate, release inert gases (i.e., N$_2$) upon decomposition with heat. Accordingly, in particularly desirable embodiments, the inorganic salt is a flame retardant inorganic salt. The compositions of the invention are substantially non-intumescent, in the absence of added intumescent material. This does not preclude, however, the addition of minor amounts of intumescent additives such as intumescent catalysts, carbonifics, and/or blowing agents to the compositions.

EXAMPLE 1

Preparation of Micronized Ammonium Sulfate

Approximately 20 pounds of ammonium sulfate and approximately 15 pounds of glass balls with sizes ranging from 0.5 to 1 inches were placed in a standard cement mixer. The ammonium sulfate was ground for about four hours. The material was then passed through a 500 Tyler mesh screen. Substantially all of the material passed through the screen indicating that the maximum particle size was about 25 μm. This material was used to make the materials described in the following examples.

EXAMPLE 2

Approximately 60 gm of micronized ammonium sulfate from Example 1 was mixed with approximately 21 gm of a standard compounded PVC (see Table II) and approximately 19 gm pounds of the 2-ethyl hexyl diphenyl plasticizer Santicizer® 141 (Ferro Corp.). The mixture was formed into sheets having a thickness of about 30 mil with twin rollers operating at 380° F. for about five minutes, or until homogeneous.

EXAMPLE 3

Approximately 55 gm pounds of micronized ammonium sulfate from Example 1 was mixed with approximately 26 gm pounds of a standard compounded PVC (see Table II) and approximately 19 gm pounds of the 2-ethyl hexyl diphenyl plasticizer Santicizer® 141 (Ferro Corp.). The mixture was formed into sheets having a thickness of about 30 mil with twin rollers operating at 380° F. for about five minutes, or until homogeneous.

This material was tested for fire retardancy by an independent laboratory with the Underwriters Laboratories ("UL") flame test designated UL-94. The material received the highest UL-94 rating of V-0.

The material also passed the U.S. Government standard for flammability resistance FAR 25.853. That test involves subjecting a panel to edge burning by a flame maintained at 1550° F. for a period of 60 seconds and requires that the material be self-extinguishing before 15 seconds and that it be non-dripping. After subjecting the material to flame for 60 seconds, there was no flaming or dripping of the material.

EXAMPLE 4

Approximately 50 gm of micronized ammonium sulfate from Example 1 was mixed with approximately 31 gm of a standard compounded PVC (see Table II) and approximately 19 gm pounds of the 2-ethyl hexyl diphenyl plasticizer Santicizer® 141 (Ferro Corp.). The mixture was formed into sheets having a thickness of about 30 mil with twin rollers operating at 380° F. for about five minutes, or until homogeneous.

EXAMPLE 5

Approximately 35 gm of micronized ammonium sulfate from Example 1 was mixed with approximately 46 gm pounds of a standard compounded PVC (see Table II) and approximately 19 gm pounds of the 2-ethyl hexyl diphenyl plasticizer Santicizer® 141 (Ferro Corp.). The mixture was formed into sheets having a thickness of about 30 mil with twin rollers operating at 380° F. for about five minutes, or until homogeneous.

The material also passed the U.S. Government standard for flammability resistance FAR 25.853(b). That test involves subjecting a panel to edge burning by a flame maintained at 1550° F. for a period of 12 seconds and requires that the material be self-extinguishing before 15 seconds and that it be non-dripping. After subjecting the material to flame for 12 seconds, there was no flaming or dripping of the material.

EXAMPLE 6

This example provides a material according to the invention wherein the polymeric binder is a thermosetting polymer. 48 parts of polyester resin 48 (approximately 4 pounds) was mixed with 52 parts (approximately 4.5 pounds) ammonium sulfate from Example 1 in one gallon container. The composition was mixed until homogenous, about 5 minutes, with a drill blade. After mixing, about 900 drops of a methyl ethyl ketone peroxide (MEKP) hardener was added to set the material.

A 24 feet, 30 mil thick coating of this material was subjected to ASTM E-84 flame spread and smoke evolution testing. The flame spread index was 15 and smoke index was 45. There was no evidence of progressive combustion after 30 minutes. Thus, the material passed ASTM E-84 with a Class A rating.

It will be understood that the recitation of ranges contained herein are as a matter of convenience only and the inventors are in possession of every value intermediate within the ranges. That is, every intermediate value or sub-range within a disclosed range should be understood to be inherently disclosed.

The invention having been described by the foregoing description of the preferred embodiments, it will be understood that the skilled artisan may make modifications and variations of these embodiments without departing from the spirit or scope of the invention as set forth in the following claims.

The invention claimed is:

1. A foamed composition comprising:
   (a) a polyurethane polymer in an amount of about 10 to about 60% by weight of the composition; and
   (b) ammonium sulfate in an amount above 30 up to about 80% by weight of the composition having an average particle size of less than about 62 μm; wherein
   the ammonium sulfate is in a micronized form when introduced into the polyurethane polymer,
   the foamed composition has a reduced propensity to ignite or smoke in the presence of heat or flame as compared to the polyurethane polymer alone,
   the foamed composition is fire retardant and has a petroleum-derived polymeric component content that is at least about 30% lower than the petroleum-derived polymeric component content of polyethylene, and
   the foamed composition meets the U.S. Government standard for flammability resistance FAR 25.853(b) and/or passes the ASTM E-84 test with a Class A rating.

2. The composition of claim 1 wherein the ammonium sulfate has an average particle size between about 0.1 and about 30 μm.

3. The composition of claim 2 wherein the ammonium sulfate has an average particle size between about 1 and about 10 μm.

4. The composition of claim 1 wherein the ammonium sulfate is present in an amount between about 40 to about 80% by weight of the composition.

5. The composition of claim 4 wherein the polyurethane polymer is present in an amount between about 10 and about 50% by weight of the composition and the ammonium sulfate is present in an amount between about 40 to about 80% by weight of the composition.

6. The composition of claim 5 wherein the polyurethane polymer is present in an amount between about 10 and about 40% by weight of the composition and the ammonium sulfate is present in an amount between about 50 to about 80% by weight of the composition.

7. The composition of claim 6 wherein the polyurethane polymer is present in an amount between about 10 and about 30% by weight of the composition and the ammonium sulfate is present in an amount between about 60 to about 80% by weight of the composition.

8. The composition of claim 1 further comprising one or more additives selected from the group consisting of plasticizers, stabilizers, fillers, blending resins, pigments, and impact modifiers.

9. The composition of claim 8 wherein the one or more additives are present in an amount between about 0.05% and about 35% by weight of the composition.

10. A foamed composition comprising:
    a plurality of ammonium sulfate particles having an average particle size of less than about 62 μm held in a homogenous physical unit by a plastic polymeric binder; wherein
    at least a portion of the ammonium sulfate is in a micronized form when introduced into the plastic polymeric binder,
    the ammonium sulfate particles are present in an amount above 30 up to about 80% by weight of the composition,
    the foamed composition has a reduced propensity to ignite or smoke in the presence of heat or flame as compared to the plastic polymeric binder alone,
    the foamed composition is fire retardant and has a petroleum-derived polymeric component content that is at least about 30% lower than the petroleum-derived polymeric component content of polyethylene,
    the foamed composition meets the U.S. Government standard for flammability resistance FAR 25.853(b) and/or passes the ASTM E-84 test with a Class A rating, and
    the plastic polymeric binder comprises a polyurethane polymer.

11. The composition of claim 10 wherein the ammonium sulfate has an average particle size between about 0.1 and about 30 μm.

12. The composition of claim 11 wherein the ammonium sulfate has an average particle size between about 1 and about 10 μm.

13. The composition of claim 10 wherein the plastic polymeric binder is present in an amount between about 10 and about 60% by weight of the composition and the ammonium sulfate is present in an amount between about 40 to about 80% by weight of the composition.

14. The composition of claim 13 wherein the plastic polymeric binder is present in an amount between about 10 and about 50% by weight of the composition and the ammonium sulfate is present in an amount between about 40 to about 80% by weight of the composition.

15. The composition of claim 14 wherein the plastic polymeric binder is present in an amount between about 10 and about 40% by weight of the composition and the ammonium sulfate is present in an amount between about 50 to about 80% by weight of the composition.

16. The composition of claim 15 wherein the plastic polymeric binder is present in an amount between about 10 and about 30% by weight of the composition and the ammonium sulfate is present in an amount between about 60 to about 80% by weight of the composition.

17. The composition of claim 1, wherein the composition has a bulk, and the bulk of the composition is provided by the ammonium sulfate.

18. The composition of claim 10, wherein the composition has a bulk, and the bulk of the composition is provided by the ammonium sulfate.

19. The composition of claim 1, wherein the composition passes the UL-94 test.

20. The composition of claim 10, wherein the composition passes the UL-94 test.

* * * * *